(12) United States Patent
Guccione et al.

(10) Patent No.: US 9,762,583 B2
(45) Date of Patent: Sep. 12, 2017

(54) PROTECTION AGAINST UNSOLICITED COMMUNICATION

(75) Inventors: Louis J. Guccione, East Chester, NY (US); Inhyok Cha, Yardley, PA (US); Andreas Schmidt, Frankfurt (DE); Andreas Leicher, Frankfurt (DE); David G. Greiner, New Hyde Park, NY (US); Dolores F. Howry, Wayne, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 561 days.

(21) Appl. No.: 12/910,596

(22) Filed: Oct. 22, 2010

(65) Prior Publication Data

US 2011/0265153 A1    Oct. 27, 2011

Related U.S. Application Data

(60) Provisional application No. 61/254,610, filed on Oct. 23, 2009.

(51) Int. Cl.
*G06F 7/04* (2006.01)
*G06F 15/16* (2006.01)
(Continued)

(52) U.S. Cl.
CPC ............ *H04L 63/101* (2013.01); *G06F 21/33* (2013.01); *G06F 21/36* (2013.01); *H04L 12/585* (2013.01);
(Continued)

(58) Field of Classification Search
CPC ... H04L 63/08; H04L 63/0869; H04L 63/101; H04L 12/585; H04L 51/12; H04L 63/0227; H04L 63/145; H04L 65/1016; H04L 63/1416; H04L 63/1408; H04L 63/1441; H04L 63/1458; G06F 21/33; G06F 21/36; G06F 21/552; H04W 12/06
(Continued)

(56) References Cited

U.S. PATENT DOCUMENTS 7,373,660 B1 * 5/2008 Guichard ................ H04L 47/10
726/15
2003/0204569 A1 * 10/2003 Andrews et al. ............. 709/206
(Continued)

OTHER PUBLICATIONS

"ITU Survey On Anti-Spam Legislation Worldwide", WSIS Thematic Meeting on Cybersecurity, Jun. 28-Jul. 1, 2005, 62 pages.
(Continued)

*Primary Examiner* — Evans Desrosiers
(74) *Attorney, Agent, or Firm* — Baker & Hostetler, LLP

(57) ABSTRACT

Methods and apparatus are disclosed to provide protection against Unsolicited Communication (UC) in a network, such as, without limitation, an Internet Protocol (IP) Multimedia Subsystem (IMS). A communication may originate from a sending device and may be intended for delivery to a receiving device. A network may determine authentication information associated with the sending device. The network may send the authentication information to a receiving entity to evaluate if the communication is unsolicited using the authentication information. If the communication is determined to be acceptable, a connection associated with the communication may be allowed.

18 Claims, 6 Drawing Sheets

(51) Int. Cl.
G06F 17/30 (2006.01)
H04L 29/06 (2006.01)
G06F 21/33 (2013.01)
G06F 21/36 (2013.01)
H04L 12/58 (2006.01)
H04W 12/06 (2009.01)

(52) U.S. Cl.
CPC .............. *H04L 51/12* (2013.01); *H04L 63/08* (2013.01); *H04L 63/145* (2013.01); *H04L 63/0227* (2013.01); *H04L 63/0869* (2013.01); *H04L 65/1016* (2013.01); *H04W 12/06* (2013.01)

(58) Field of Classification Search
USPC ...................... 728/5; 726/5, 4, 1, 13, 22–33; 713/153–154, 187–188, 193–194; 709/206, 249, 389
See application file for complete search history.

(56) References Cited

U.S. PATENT DOCUMENTS

| 2005/0132060 | A1* | 6/2005 | Mo | H04L 51/12 709/227 |
| 2005/0249219 | A1* | 11/2005 | Bajko | H04L 29/06027 370/395.3 |
| 2007/0005717 | A1* | 1/2007 | LeVasseur | H04L 51/14 709/206 |
| 2007/0107059 | A1* | 5/2007 | Chasin et al. | 726/23 |
| 2011/0002341 | A1* | 1/2011 | Damola et al. | 370/401 |

OTHER PUBLICATIONS

"Microsoft Live Hotmail Under Attack by Streamlined Anti-CAPTCHA and Mass-Mailing Operations", WebSense, Archived Blog, Apr. 10, 2008, 13 pages.
"Report Of The OECD Task Force On SPAM: Anti-SPAM Toolkit of Recommended Policies and Measures", OECD Digital Economy Papers, Apr. 19, 2006, 115 pages.
"Caslon Analytics Note Spam Regulation", http://www.caslon.com.au/spamnote.htm, accessed Mar. 15, 2011, 6 pages.
3GPP TR 33.828, V1.54.0, "3rd Generation Partnership Project; Technical Specification Group Services and System Aspects; IMS Media Plane Security (Release 8)", Sep. 2009, 69 pages.
3GPP TR 33.837, V1.0.0, "3rd Generation Partnership Project; Technical Specification Group Services and System Aspects; Study of Mechanisms for Protection Against Unsolicited Communication for IMS (PUCI) (Release 9)", May 2009, 65 pages.
3GPP TR 33.937 V9.1.0, "3rd Generation Partnership Project; Technical Specification Group Services and System Aspects; Study of Mechanisms for Protection against Unsolicited Communication for IMS (PUCI) (Release 9)", Technical Report, Apr. 2010, 1-93.
3GPP TR 33.cde, V0.0.2, "3rd Generation Partnership Project; Technical Specification Group Services and System Aspects; Protection Against SMS and MMS SPAM; Study of Different SPAM Protection Mechanisms (Release 8)", Jun. 2009, 26 pages.
3GPP TS 22.228 V10.1.0, "3rd Generation Partnership Project; Technical Specification Group Services and System Aspects; Service requirements for the Internet Protocol (IP) multimedia core network subsystem; Stage 1, (Release 10)", Sep. 2009, 1-35.
3GPP TS 24.611 V9.1.0, "3rd Generation Partnership Project; Technical Specification Group Core Network and Terminals; Anonymous Communication Rejection (ACR) and Communication Barring (CB); using IP Multimedia (IM) Core Network (CN) subsystem; Protocol specification (Release 9)", Technical Specification, Sep. 2009, 1-22.
3GPP TS 29.228 V8.6.0, "3rd Generation Partnership Project; Technical Specification Group Core Network and Terminals; IP Multimedia (IM) Subsystem Cx and Dx interfaces; Signalling flows and message contents (Release 8)", Technical Specification, Sep. 2009, 1-65.
3GPP TS 29.229, V8.7.0, "3rd Generation Partnership Project; Technical Specification Group Core Network and Terminals; Cx and Dx Interfaces Based on The Diameter Protocol; Protocol Details (Release 8)", Sep. 2009, 35 pages.
3GPP TS 29.328, V7.11.0, "3rd Generation Partnership Project; Technical Specification Group Core Network and Terminals; IP Multimedia (IM) Subsystem (IMS) Sh Interface; Signalling Flows and Message Contents (Release 7)", Sep. 2009, 45 pages.
3GPP TS 29.329 V8.4.0, "3rd Generation Partnership Project; Technical Specification Group Core Network and Terminals; Sh Interface based on the Diameter protocol; Protocol details (Release 8)", Technical Specification, Jun. 2009, 1-19.
3GPP, TR 21.905, V10.0., "3rd Generation Partnership Project; Technical Speciation Group Services and System Aspects; Vocabulary for 3GPP Specifications (Release 10)", Sep. 2009, 58 pages.
Allman et al., "DomainKeys Identified Mail (DKIM) Signatures", Network Working Group, May 2007, 1-71.
D'Heureuse et al., "Protecting SIP-based Networks and Services from Unwanted Communications", IEEE, Global Telecommunications Conference (GLOBECOM 2008), New Orleans, LO, USA, Nov. 30-Dec. 4, 2008, 6 pages.
ETSI TR 187 009 V2.1.1, "Telecommunications and Internet Converged Services and Protocols for Advanced Networking (TISPAN); Feasibility study of prevention of unsolicited communication in the NGN", Technical Report, Jul. 2008, 1-26.
Moustakas et al., "Combating Spam Through Legislation: A Comparative Analysis Of US And European Approaches", In Proceedings of CEAS, 2005, 8 pages.
Palfrey, Jr., "Stemming The International Tide Of SPAM", Trends in Telecommunication Reform 2006, 7th Edition, Chapter 7, 2006, 111-125.
PCT Application No. PCT/US2010/053672 : International Search Report and Written Opinion of the International Searching Authority, Jan. 3, 2011, 12 pages.
Peterson et al. "Enhancements for Authenticated Identity Management in the Session Initiation Protocol (SIP Identity)", The Internet Engineering Task Force (IETF), RFC #4474, Aug. 2006, 41 pages.
Rosenberg et al. Session Initiation Protocol (SIP) and Spam, The Internet Engineering Task Force (IETF), RFC #5039, Jan. 2008, 28 pages.
Rosenberg et al., "A Framework for Consent-Based Communications in the Session Initiation Protocol (SIP)", The Internet Engineering Task Force (IETF), Nov. 13, 2007, 32 pages.
Rosenberg, "Concerns Around the Applicability of RFC #4474", The Internet Engineering Task Force (IETF), Feb. 17, 2008, 14 pages.
Wong et al., "Sender Policy Framework (SPF) for Authorizing Use of Domains in Email, Version 1", The Internet Engineering Task Force (IETF), RFC #4408, Apr. 2006, 49 pages.
Zourzouvillys, "Addressing an Amplification Vulnerability in Session Initiation Protocol (SIP) Servers", The Internet Engineering Task Force (IETF), Feb. 20, 2009, 14 pages.

* cited by examiner

US 9,762,583 B2

PROTECTION AGAINST UNSOLICITED COMMUNICATION

CROSS-REFERENCE TO RELATED APPLICATIONS

This application is based on, and claims priority to, U.S. Provisional Patent Application No. 61/254,610, filed on Oct. 23, 2009, the contents of which are hereby incorporated by reference in their entirety.

BACKGROUND

The Internet Protocol (IP) Multimedia Subsystem (IMS) may be used for delivering IP multimedia services to a wireless transmit/receive unit (WTRU). Unsolicited Communication (UC) includes communication where the recipient does not want to receive the communication. UC may include SPAM over IP Telephony (SPIT) or Spam over IP Messaging (SPIM). UC may originate with a source within an IMS network, or it may originate from a source outside an IMS network.

Problems may exist with current UC prevention measures. For example, where a network operator manages UC contractually, it may be inexpensive to obtain new sender identities. The use of IMS may include added responsibility for operators and increased capital expenditure. Denial of service (DoS) prevention for the domain of time-critical communication may not be cost-efficient. Adaptive or random simulated behavior may mimic legitimate patterns well and management of the DoS prevention measures may become costly. Existing mitigation methods for DoS are network-centric, while UC, SIPT, and SPIM are receiver-centric. For example, an attacker may cause mayhem to a receiver without loading the network. It may be difficult for a network provider to protect customers from SPIT. Barring of communication based on automated reasoning of network entities, without involvement of a recipient, may give rise to regulatory and legal challenges.

Other UC attacks may be directed at the WTRU. Given the variety of platforms and systems which interact with each other, the large amount of reference values for trustworthy integrity attestation may make WTRU based attacks difficult to prevent. UC prevention measures, such as Consent Mailboxes (CMB), may be abused by SPITers by placing their spam messages on the CMB. For example, a SPITer may request to be added as a contact with the request message being spam, or may add a user of the target WTRU as a contact and may send the spam message in the welcome text.

SUMMARY

Systems and methods are disclosed that may provide protection against Unsolicited Communication (UC) in a network, such as, without limitation, an Internet Protocol (IP) Multimedia Subsystem (IMS). In the case of IMS, the protection may be referred to as Protection against Unsolicited Communication (UC) in an Internet Protocol (IP) Multimedia Subsystem (IMS) ("PUCI").

A network may receive a communication. The communication may originate from a sending device (e.g., a first WTRU) and may be intended for delivery to a receiving device (e.g., a second WTRU). The network may be a sending network associated with the sending device, a third party network, or a receiving network associated with the receiving device. The network may determine authentication information associated with the sending device. The authentication information may include a strong sender identity or state information associated with the sending device. The strong sender identity may be incapable of being manipulated by the a sender of the communication. The strong sender identity may be a network asserted identity. The state information may relate to a health status of the sending device, such as the status of virus protection software or the presence of malware on the sending device. The authentication information may be sent to a receiving entity such as a third party network, receiving network, or receiving device. The receiving entity may evaluate the authentication information to determine if the communication is unsolicited. The receiving entity may remove malware from the sending device.

A receiving entity, such as a third party network, receiving network, or receiving device, may receive a communication originating from a sending device. The receiving entity may perform a test to determine if the communication is unsolicited. The test may comprise a challenge/response test or an identification check. For example, the challenge/response test may comprise a Turing test or a question/answer exchange that may identify certain characteristics of the sending entity. The identification check may comprise a state/health check of the sending entity (e.g. sending device, sending network), an address check, or comparing an identifier associated with the sending device to one or more lists (e.g., whitelist, blacklist, etc.). The test may comprise determining authentication strength, presence of certified hardware on the sending device, presence of certified software on the sending device, or liability regarding a claimed sender identity. One or both of evaluating the authentication information or performing the test may be carried out. Further, multiple evaluations or tests may be performed by one or more entities. The test may be performed by an internal application server or third party application server. The receiving entity may deny a connection relating to the communication when the communication is determined to be unsolicited. The receiving entity may allow a connection relating to the communication when the communication is determined to be acceptable (e.g., not determined to be an unsolicited communication). For example, a call from a first WTRU to a second WTRU may be connected. Denying or allowing the connection may be performed by a receiving network or a receiving device.

Other features of the systems, methods and instrumentalities described herein are provided in the following detailed description and accompanying drawings.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

FIGS. 1-6 may relate to exemplary embodiments in which the disclosed systems, methods and instrumentalities may be implemented. However, while the present invention may be described in connection with exemplary embodiments, it is not limited thereto and it is to be understood that other embodiments may be used or modifications and additions may be made to the described embodiments for performing the same function of the present invention without deviating therefrom. Further, the figures may illustrate call flows, which are meant to be exemplary. It is to be understood that other embodiments may be used. Further, the order of the flows may be varied where appropriate. In addition, flows may be omitted if not needed and additional flows may be added.

When referred to hereafter, the terminology "wireless transmit/receive unit (WTRU)" may include, but is not limited to, a user equipment (UE), a mobile station (MS), a mobile equipment (ME), an advanced mobile station (AMS), a fixed or mobile subscriber unit, a pager, a cellular telephone, a personal digital assistant (PDA), a computer, a tablet, a smart phone, a gaming box or a portable gaming device, or any other type of user device capable of operating in a wireless environment.

When referred to hereafter, the terminology "base station" may include, but is not limited to, a Node-B, an advanced base station (ABS), a site controller, a gateway, a Home (e)Node-B, an access point (AP), or any other type of interfacing device capable of operating in a wireless environment. The terminology "WTRU" and "base station" may not be mutually exclusive.

When referred to hereafter, the terms "trust," "trusted," and "trustworthy," as well as variations thereof, may indicate a quantifiable and observable manner of assessing whether a unit may function in a particular manner. When referred to hereafter, the terminology "Trusted Domain (TD)", and variations thereof, may include, but are not limited to, a Domain. When referred to hereafter, the terminology "Trusted Module (TrM)" includes but is not limited to a complete secure execution and storage environment for a WTRU platform.

When referred to herein, the term authentication information may relate to information about the state/health of a device, the state/health of a network element, the identity of a sender/sending device (e.g., strong sender identity), the identity of a sending network element, hardware identity feature such as a silicon ID, chip ID, etc.

Figure 1:
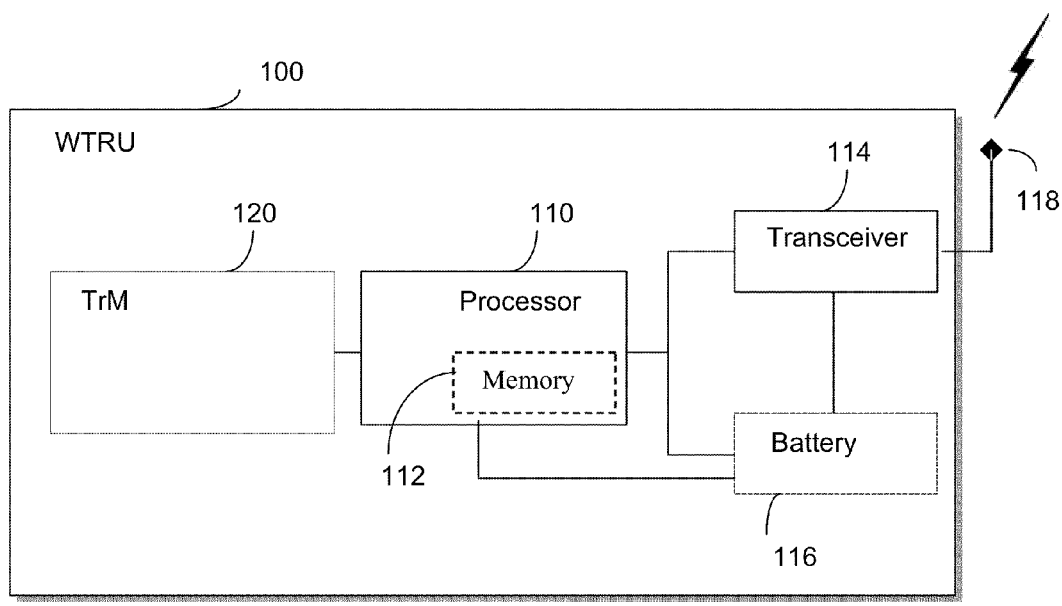
FIG. 1 is a functional block diagram of an exemplary wireless transmit/receive unit.

FIG. 1 is a block diagram of an exemplary wireless transmit/receive unit (WTRU) 100 that may be used in relation to the disclosed systems, methods and instrumentalities. In addition to the components that may be found in a typical WTRU, the WTRU 100 may include one or more of: a processor 110, a linked memory 112 linked to processor 112, a transceiver 114, a battery 116, and an antenna 118. The processor 110 may be configured to perform a method of protection against unsolicited communication. The transceiver 114 may be in communication with the processor 110 and the antenna 118 to facilitate the transmission and reception of wireless communications. In case the battery 116 is used in the WTRU 100, it may power the transceiver 114 and the processor 110. The WTRU 100 may also include a Trusted Module (TrM) 120.

Protection against Unsolicited Communication (UC) may include the use of strong sender identities, for example sender identities that may not be manipulated by the sender, such as a Network Asserted Identity. A Network Asserted Identity may refer to sender/caller identities that the originating network authenticated and for which an assertion was issued (e.g., a signed header field, including additional caller information, etc., may be added. Strong sender identities may be used to enable originator-based filtering functions. A trust infrastructure may be based on a permissions based sending/consent based communication (PBS/CBC) combination. A PBS infrastructure may provide trust extensions. A communication and its signaling paths may be linked.

In the case of IMS, when a UC originates from inside an IMS network, the network operator may use a strong sender identity to limit the capabilities of a UC sender (SPITer). For example, the SPITer's bandwidth may be reduced after a certain volume of traffic or based on a time limit. For normal IP traffic, it may be inexpensive to obtain a sender's identity. Signaling and communication messages may be transported in a single path to provide a strong binding of authenticated identities to communication originating from these identities.

For UC traffic originating outside the IMS network, a trust infrastructure may translate claimed sender identities from one trust domain into another, such as the receiving IMS network. A domain may provide a trusted endpoint which acts as an identity gateway to outside domains. An operator of the domain may provide the identity gateway as an authentication service which allows users to obtain an authentication of their claimed identity, and a credential issued by the gateway, such as a Network Asserted Identity. The operator may charge a fee for the use of such a service. Similar to the payment at risk approach, the operator may prevent SPITers from requesting multiple identities using multiple, or fake, WTRUs.

WTRUs may be notified of payments to uncover cases of device hijacking. An authenticated identity may be bound to the WTRU directly, for example by using cryptographic protocols which may allow using identity credentials with the device which holds them legitimately (e.g., the identity credentials may be limited to use with the device which holds them legitimately). UC prevention mechanisms based on strong identities may be independent of underlying, domain-dependent authentication mechanisms, such as an Extensible Authentication Protocol Method for Universal Mobile Telecommunications System (UMTS) Authentication and Key Agreement (EAP-AKA) or other network-specific authentication protocols.

A first WTRU (Alice), the receiving device, may specify that connections from trusted domains may be accepted/allowed. A second WTRU (Bob), the sending device, may initiate a call to Alice. Bob's gateway, the sending network, may inform Bob that Bob may use a valid, authenticated identity to call Alice. Bob may contact Bob's gateway and may perform or initiate a procedure in which Bob's identity is authenticated and certified by Bob's gateway. This procedure may include measures to protect the integrity and confidentiality of the exchanged messages.

Using the certified identity, Bob may call Alice. Alice may check the claimed identity of Bob using the gateway-issued credential, and may accept the call (e.g., allow the connection). The check may be performed by Alice's network (the receiving network), a third party network, or by Alice's WTRU (the receiving device). Alice's identity gateway (the receiving network) may check the validity and freshness of the certified identity of Bob before accepting the call.

An originator of a call may present an identity (which may comprise an identifier) that is certified and attested to by another trusted domain operator or a trusted third party, e.g., a third party network. Alice or the receiving network may compare an identifier associated with a call to an approved list of identifiers (e.g., a whitelist) and/or a disapproved list of identifiers (e.g., a blacklist). That is, by testing the identifier, Alice or the receiving network may determine if a communication is solicited/unsolicited. For example, Alice may determine that an identifier is on a whitelist or not on a blacklist, and in response, accept the call (e.g., allow the connection). As another example, Alice may determine that an identifier is not on a whitelist or on a blacklist, and in response, decline the call (e.g., deny the connection). An operator may bind the process of identity certification to hardware and platform properties of the WTRU.

A supplementary service may be used for UC protection. For example, a blacklist and a whitelist may be implemented using Incoming Call Barring, Anonymous Call Rejection, and Closed User Groups. Automated handling of suspected UC may be implemented using Call Diversion on Originating Identity. Accountability for transgressions may be aided by the use of Malicious Call Identification.

Where the UC originator is outside the IMS network, or in the absence of sender identity verification, or, even with use of strong sender ID's, UC protection may include strong binding of a sender's identity to a sending device. Spoofed identities may be detected using a test, such as a challenge/response mechanism. If a malicious user Eve attempts to use Bob's spoofed identity to send UC to Alice (that is, Eve may be the sending device), Alice's IMS network may check to determine whether Bob initiated the session by contacting Bob. For example, if Bob is offline, it is a spoofed address. If Bob truthfully proves that it initiated the call, the address of the sending device may be verified and the call may be forwarded to Alice. By linking back to the sender (Bob), direct UC may be prevented for spoofed sender identities.

UC may be identified by a subscriber or by a network-based mechanism to correlate user behavior. Identification may include labeling that allows marking a source of a potential UC message as a potential SPITer, and, for a security update. After a successful security update, the former SPITer may be marked as on probation for a time period. After the device's clean state is confirmed to the network, the device may be removed from the blacklist. These actions may be performed in a transparent way to the user, for example, to avoid unnecessary calls to help-desks.

A dedicated infrastructure for trust management and validation may be used. For example, an infrastructure similar to the infrastructure used for enhanced Home Node Bs (H(e)NBs) and machine-to-machine (M2M) networks. A combination with Trusted Identity Management (IdM) may be used so that peers may build a web of trust which relays the IMS messages between trusted senders and receivers.

If many users have complained about UC and the source can be identified, other subscribers may be warned as they receive incoming communications. User feedback reports may be leveraged to construct a negative reputation system regarding subscriber behavior. Trust related information may be bound to a platform or a device to prevent feedback based attacks, such as badmouthing. A communication web may be built on positive, rather than negative reputation, and may include binding trust information to a device.

Where the originator of targeted UC is outside the IMS network or a trustworthy sender identity may not be identified, a minimum security level and authenticated sender identities may be used. Verifiable and reliable tracking of identities to real subscribers may be used to provide protection.

To prevent targeted UC, users of the IMS network may define policies on minimal sender identity authentication strength requirements for calls they want to receive. For example, users may specify that a sender identity may need to be authenticated with a certain level of security, such as by a trusted third party. A receiving user's WTRU or receiving IMS network may obtain assurance about the protection of identity credentials on a sender's device. Techniques such as identity claims, using interoperable formats, and identity federation across domains may be combined with policy-based protection mechanisms.

A WTRU may be hacked to create a botnet for sending UC from a WTRU with valid credentials. To protect against botnets, the network may identify the hacked WTRU and add it to a blacklist of known SPITers. To be removed from the blacklist, the entity which maintains the blacklist may verify that the WTRU causing UC was hijacked and that the issue is resolved. An attestation scheme that issues tokens after assessing a device's integrity, e.g., the state of the health of the device (health status), may be used for verification. The WTRU may be connected to a quarantine network, and the WTRU's behavior may be monitored (e.g., for a period of time, a number of communications, etc.).

For a WTRU identified as a possible source of UC, outgoing communications from the WTRU may be marked as potential UC. The WTRU may be removed from the blacklist based on positive feedback. For example, a WTRU may be added to the blacklist and given a negative reputation score. The WTRU may improve its reputation score based on user calls, which may allow the reputation score to be reset.

To protect the IMS network against compromised (e.g., botnet-infected) WTRUs, a user of a WTRU may be informed that the user's WTRU may be infected and is suspected of sending UC, and, to give the user a chance to remove malware from the WTRU. The operator may remove the malware as a service to the user with or without the user's knowledge. The operator may require evidence from the user that the issue has been resolved. Standardized software to check and update the WTRU may be used as evidence. The WTRU may include a secure and trusted execution environment, such as a Trusted Module TrM. The TrM may attest to the trust_state of the WTRU.

To protect the IMS network against compromised WTRUs, the sending network of the WTRU may be informed that the sending WTRU may be infected and is suspected of sending UC. The sending network may act to remove malware from the WTRU, with or without involving the user of the sending WTRU. The operator may remove the malware with or without the user's knowledge. The operator may inform the user that the issue has been resolved. Standardized software to check and update the WTRU may be used as evidence. The WTRU may include a secure and trusted execution environment, such as a Trusted Module TrM. The TrM may attest to the trust_state of the WTRU to the sending WTRU's network.

As a basis for pre-session or in-session detection of a malicious WTRU, the state of a WTRU may be verified, for example, using platform validation. State information may be generated relating to a health status of a WTRU (e.g., a sending device). For example, the WTRU may/may not contain malware, may/may not have up-to-date anti-virus software program, etc.

The network may require proof from a WTRU that the WTRU is in a known, good state before session establishment is allowed. For WTRUs that are built on open platforms with a large number of admissible configurations, system-state validation may include the WTRU providing validation by proving the absence of known malware on the platform or the presence and activated state of a desired malware-prevention component, such as an up-to-date anti-virus software program. The WTRU may make assertions on the strength of protection of credentials and secrets used to establish sender identities by the WTRU.

To protect the IMS network against compromised network element(s) in the sending network's domain, a part of the sending network (e.g., an uncompromised part or a part that cannot be compromised) may be informed that the some network elements in the sending WTRU's network may be compromised and is suspected of sending UC. The part of the sending network may act to remove malware from the network elements suspected of being compromised, with or without involving the user of the sending WTRU. The operator may inform the user that the issue has been resolved. Standardized software to check and update the network elements may be used as evidence. The sending network may include a secure and trusted execution network environment, which may attest to the trust_state of the non-WTRU network elements to the receiving network, along with the call itself, to aid the receiving network to consider the state information about the sending network's elements in determining UC.

To protect against sender impersonation of a WTRU, strong Identity Management (IdM) including strong authentication methods for claimed sender identities may be used across IMS and non-IMS networks for UC protection. IdM methods, such as Generic Bootstrapping Architecture (GBA) and OpenID may be used, stand-alone or in combination, to protect the IMS communication against sender impersonation.

Figure 2:
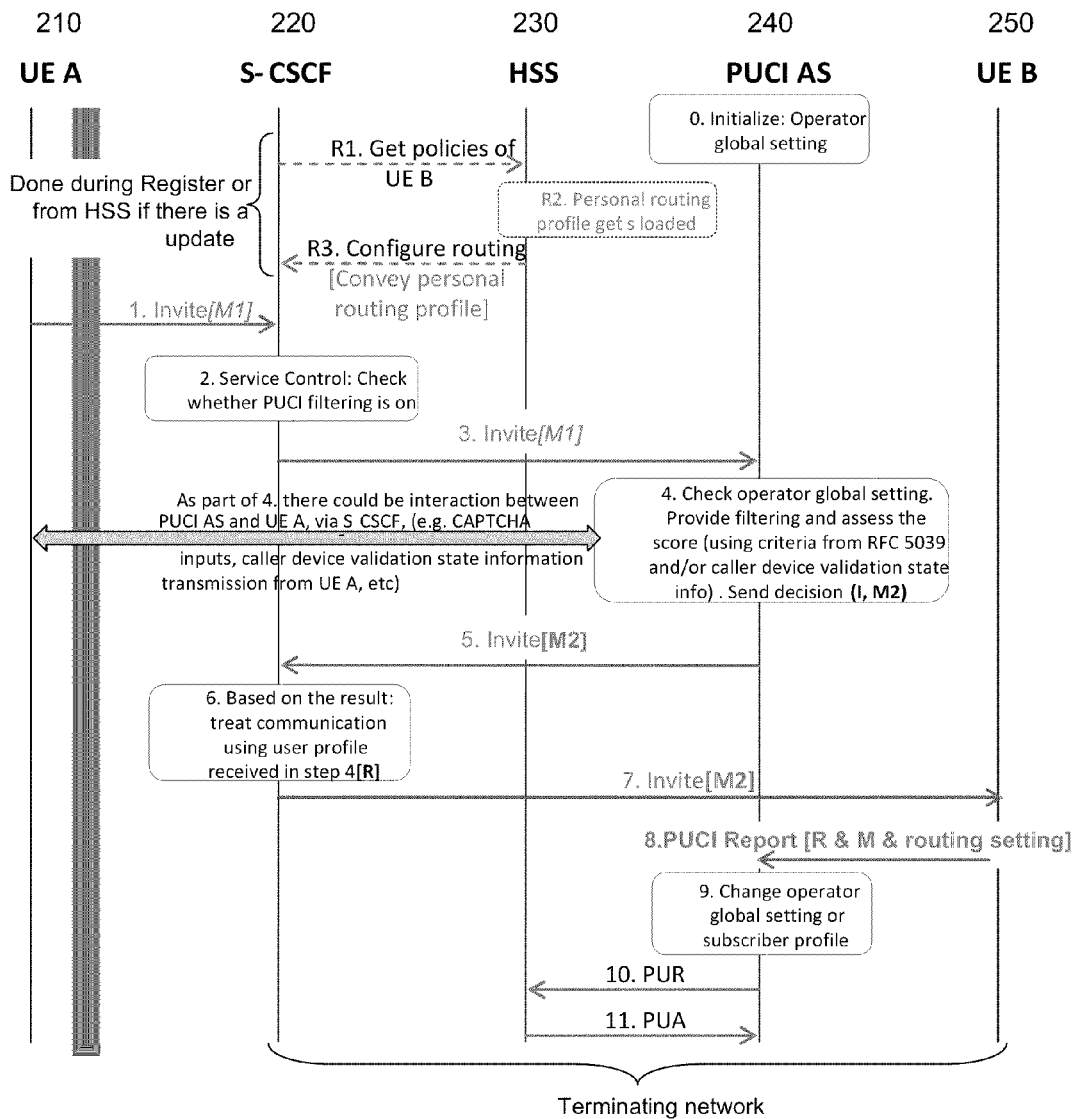
FIG. 2 illustrates an exemplary call flow diagram of one embodiment of a method and apparatus to provide protection against UC.

FIG. 2 illustrates an exemplary call flow diagram of one embodiment of a method and apparatus to provide protection against UC. FIG. 2 includes a sending device, UE A 210, as well as a receiving device, UE B 250. FIG. 2 also illustrates entities that may be part of a receiving network associated with UE B 250, including a Home Subscriber server, HSS 230, and a PUCI application server, PUCI AS 240. PUCI AS 240 may be an internal application server. A Serving Call Session Control Function, S-CSCF 220 may be associated with the HSS 230, e.g., for secure information exchange.

At R1, policies may be identified for UE B 250 by S-CSCF 220 during IMS registration, e.g., using a standard Diameter message. At R2, HSS 230 may receive the policies and check them. HSS 230 may receive the policies in the form of a personal routing profile. The personal routing profile may include a flag indicating whether UE B 250 wants PUCI service and settings indicating to S-CSCF 220 what to do when a marking (M) is received. The marking may be a trust score value. For example, the sending network may collect various information on the sender's identity (sender identity information) and create a combined scoring that may allow the receiving device or network to perform an assessment of the received information, e.g., by evaluating a score. The sender information may be stored in a secured environment (trusted environment) in the sending device such that it may be re-used by the sending device for further communication. The sender information stored in the secured environment in the sending device may not be used by other devices. A user may indicate that an incoming call with a score above a threshold may be forwarded to a number, and may indicate that an incoming call with a score above a different threshold should be dropped.

A short sequence of markings may result in a value or numerical score. An S-CSCF routing reaction may be used (e.g., a routing decision that the S-CSCF may make based on user settings). A measure of device state validation, which may be similar to the measurements used in the peak cell rate (pCR), may be used in the marking sequence.

At R3, HSS 230 may send the routing information (e.g., the personal routing profile) to S-CSCF 220. The message may include a Diameter message, and may not require standardization. HSS 230 may send the information to S-CSCF 220 if there is an update.

At 0, PUCI AS 240 may be initialized with global operator settings, such as a blacklist that applies to users for which the operator has legal consent. An evolved Equipment Identity Register (eEIR) may be used.

At 1, S-CSCF 220 may receive a message, such as an SIP INVITE message, from a caller, such as UE A 200. The message may include PUCI related marking (M1), e.g., if other PUCI tests were already performed in a network through which the message was transmitted. At 2, S-CSCF 220 may check whether the PUCI filtering applies for UE B 250. S-CSCF 220 may use a source spoofing method.

At 3, if the PUCI service applies for UE B 250, then PUCI AS 240 may be invoked by the S-CSCF 220. S-CSCF 220 may send a message, such as an SIP INVITE message, to PUCI AS 240. The message may include PUCI related marking (M) information, e.g., if marking (M1) was already provided.

At 4, PUCI AS 240 may check the operator global setting and may provide PUCI filtering. A challenge/response procedure, such as CAPTCHA, may be used. An updated marking (M2) which may take into account marking (M1) may be received. The updated marking M2 may replace M1.

M1 may be replaced by M2 based using various techniques, such as those on which PUCI filters are based, e.g., content filtering, consent-based communication (CBC), computational puzzles, blacklists, whitelists, or Turing Tests (e.g., CAPTCHA, etc.). These assessments may be incorporated into the PUCI filtering process and may be used to determine the updated UC score (M2) provided to S-CSCF 220. Additional assessments involving, for example, caller device validation states or strength of sender identity authentication may be included in the global settings and their corresponding check on PUCI AS 240. Caller device (sending device) validation state information, which may represent distinct trust levels for the caller's WTRU, may include verifiable claims on aspects of the caller's WTRU state. For example, the absence of known malware on the caller platform, the presence and activation state of up-to-date malware prevention or virus protection programs on the caller platform, the strength of protection of sender credentials on the caller platform, such as strength of encryption and access control.

The caller platform or its network operator (sending network) may provide reliable proof that the verifiable claims are satisfied. Such proof may be provided through a trusted third party, or, if the sender network is sufficiently trustworthy, an indicator in a message such as an SIP INVITE message header field testifying to the above or another protocol. A trusted third party (e.g., a third party entity, a third party network, etc.) may provide infrastructure support to the scoring process by referencing generic configuration profiles which have known scores.

The updated marking M2 may be derived from M1 and other information obtained in the PUCI filtering process, such as CAPTCHA inputs or caller device validation state information. Other metrics, such as sender identification and authentication, reputation scores, or third party information, may also play a role in the final scoring process. This may result in a single value score of M2 and a S-CSCF routing reaction.

At 5, the value M2 may be sent to S-CSCF 220 as part of the SIP INVITE message. At 6, S-CSCF 220 may check user settings and may make a routing decision accordingly. As shown in FIG. 2, the communication is sent to UE B 250; however, it should be apparent that the call may be sent to an answering machine or forwarded elsewhere.

At 7, S-CSCF 220 may forward the SIP INVITE to UE B 250 with the marking (M2). UE B 250 may report the communication as a UC or may change its profile in the HSS 230. At 8, this information may be sent from UE B 250 to PUCI AS 240. Reporting from UE B 250 may be performed using, for example, a Web interface, keypad entries, a Ut interface, or by piggybacking to an existing message.

At 9, based on the message from UE B 250, PUCI AS 240 may modify the operator global setting, the subscriber profile, or both. These modifications may be related to local legislations and prior consent from the user. At 10, PUCI AS 240 may send a Diameter message profile update request (PUR). The communication may be routed back to the caller, the user of UE A 210, UE A 210, and, the back-routed call may be used to facilitate an assessment regarding whether remediation may be needed for UE A 210 for it to attain an acceptable device state. At 11, HSS 230 may respond with a Diameter message profile update answer (PUA).

Figure 3:
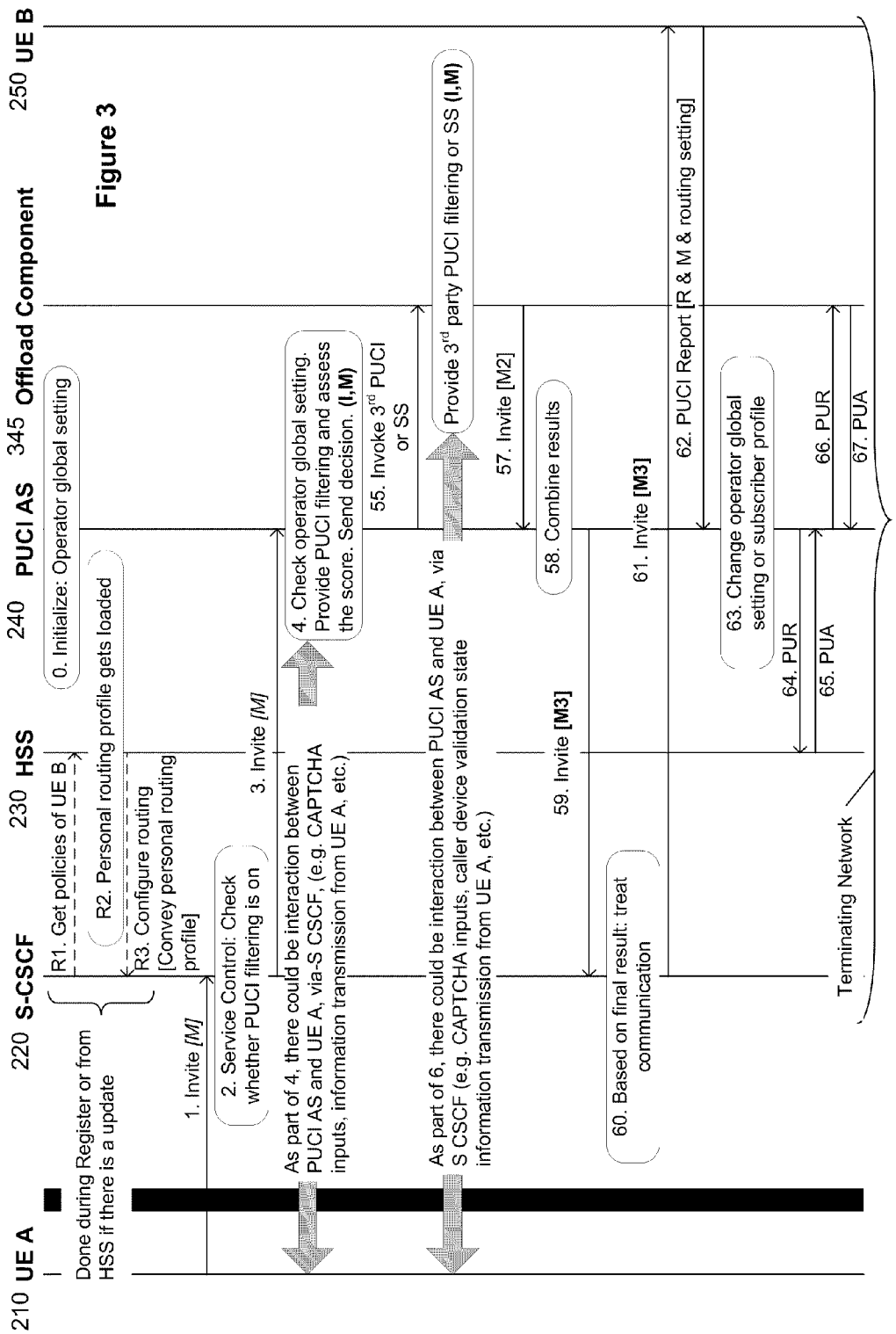
FIG. 3 illustrates an exemplary call flow diagram of another embodiment of a method and apparatus to provide protection against UC.

FIG. 3 illustrates an exemplary call flow diagram of another embodiment of a method and apparatus to provide protection against UC. FIG. 3 includes some components of FIG. 2, including UE A 210, S-CSCF 220, HSS 230, PUCI AS 240 and UE B 250. FIG. 3 includes additional features of FIG. 2, including the features at R1, R2, R3, 0, 1, 2, 3, and 4. FIG. 3 also includes offload component 345. As an example, offload component 345 may be a third party application server, such as a third party PUCI AS 346 (not shown) or supplementary services 347 (not shown). Examples of supplementary services 347 may include, but are not limited to, use of a blacklist and/or a whitelist, Incoming Call Barring, Anonymous Call Rejection, Closed User Groups, Call Diversion on Originating Identity, or Malicious Call Identification.

At 55, the processing requirements of PUCI AS 240 may be offloaded to third party PUCI AS 346 or supplementary services 347. At 56, supplementary services 347 may be provided and/or third party PUCI AS 346 may provide filtering. The offloaded part may include assessment of device states (e.g., see 4). The results of the device state assessment performed by third party PUCI AS 346 or supplementary services 347 may be used to assess the validity of the Malicious Call Identification (MCID) based on the Invite message.

At 57, the value M2 may be sent to PUCI AS 240 as part of the SIP INVITE message. At 58, the results from 4 and 6 may be combined for updated marking M3. At 59, the value M3 may be sent to S-CSCF 220 as part of the SIP INVITE message. At 60, S-CSCF 220 may check user settings and may make a routing decision accordingly. A call may be sent to an answering machine or forwarded elsewhere. The call may be routed back to the caller (e.g., the user of UE A 210) or UE A 210, and, the back-routed call may be used to facilitate an assessment regarding whether remediation may be needed for UE A 210 for it to attain an acceptable device state.

At 61, S-CSCF 220 may forward the SIP INVITE to UE B 250 with marking (M3). UE B 250 may report the communication as a UC or may change its profile in the HSS 230. At 62, this information may be sent from UE B 250 to PUCI AS 240. At 63, based on the message from UE B 250, PUCI AS 240 may modify the operator global setting, the subscriber profile, or both.

At 64, PUCI AS 240 may send a Diameter message profile update request (PUR) to HSS 230. At 65, HSS 230 may respond with a Diameter message profile update answer (PUA).

At 66, PUCI AS 240 may send a Diameter message profile update request (PUR) to offload component 345. At 67, offload component 345 may respond with a Diameter message profile update answer (PUA).

PUCI may include use of an approved list of callers (e.g., a whitelist) and a disapproved list of callers (e.g., a blacklist). For example, the lists may include identifiers corresponding to a caller or sending device.

Protection may be provided using a blacklist and anonymous call rejection. A device validation check may be used in association with an MCID check. The blacklist (BL) may include Incoming Call Barring (ICB) and may include the numbers of known UC sources. If the caller matches a BL entry, the call may be rejected and a denial announcement may be played, otherwise the caller may be put through to the subscriber.

A UC source (e.g., a sending device) may use anonymity to hide its identity. Anonymous Call Rejection (ACR) may be used block anonymous calls, which may prevent such UC. The callee may be informed about the rejection by a denial announcement. The combination of these two Supplementary Services may provide stronger SPIT/UC protection than each of them alone. Anonymous call identification may include the detection of an unknown configuration.

PUCI may include the use of a whitelist and a Consent Mailbox (CMB). A whitelist with Consent Mailbox may be achieved with Call Diversion on Originating Identity, e.g., Selective Call Forwarding.

If a caller matches a whitelist entry (e.g., the caller's identifier is on the whitelist), the caller may be put through to the callee. Otherwise, the caller may be redirected to the CMB. The caller may send a request to the callee to be added to the whitelist. A whitelist may require strong, authenticated identities or other source spoofing protection, and may be used to prevent undirected attacks.

Figure 4:
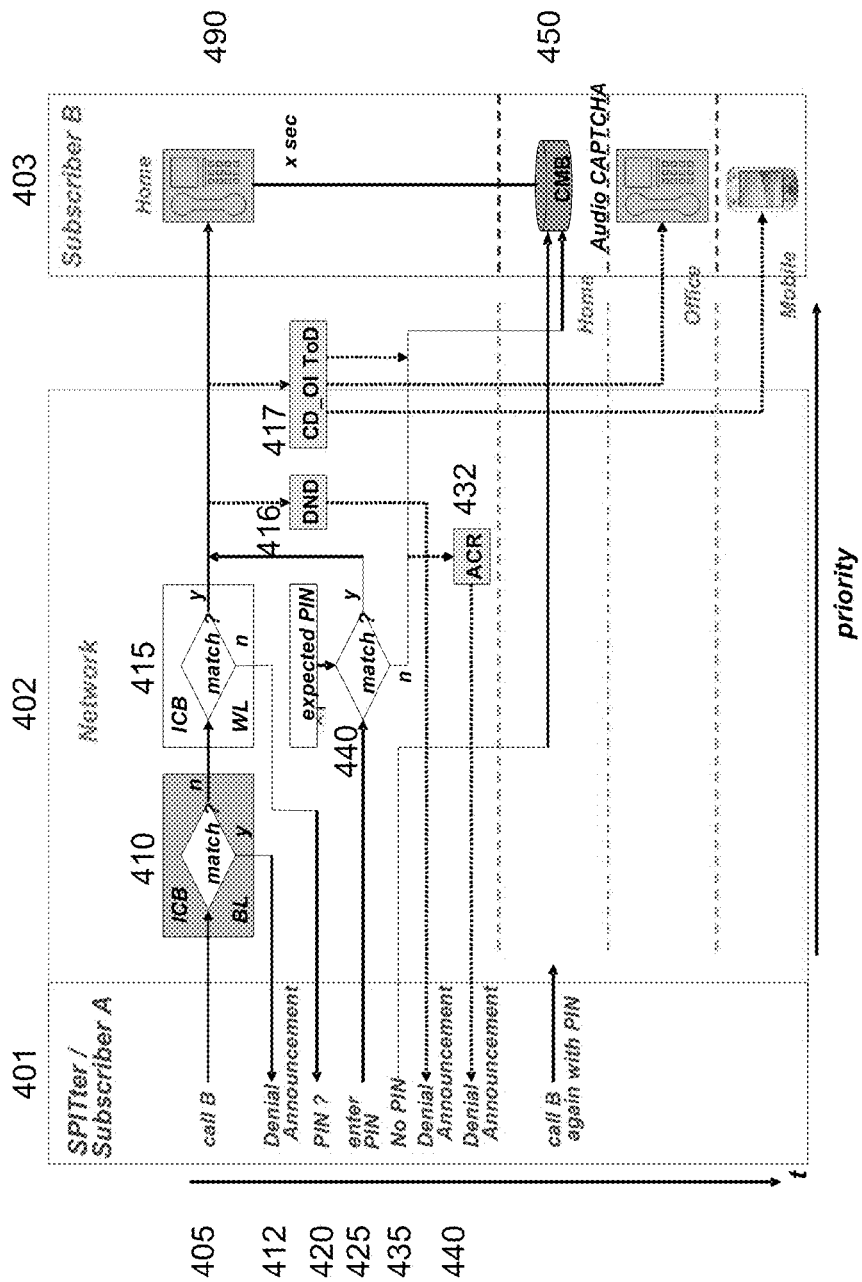
FIG. 4 illustrates another embodiment of a method and apparatus for providing protection against UC.

FIG. 4 illustrates another embodiment of a method and apparatus for providing protection against UC. A sender/sending device, such as SPITer/Subscriber A 401 may send a communication via a receiving network, such as network 402, intended for Subscriber B 403. Network 402 may be a receiving network associated with Subscriber B 403.

At 405, a communication (call B) may be sent. Network 402 may compare an identifier, such as a phone number, to a blacklist. The blacklist (BL) may include a Supplementary Service Incoming Call Barring (ICB), and may reject matching numbers with a Denial Announcement at 412. Comparison against a whitelist (WL) may also be included at 415. Callers matching an entry on the WL may be directly put through to Subscriber B 403 at 490.

At 420, a determination may be made if the caller has a PIN. If so, at 425 SPITer/Subscriber A 401 may enter a PIN. At 430, network 402 may make a determination whether the entered PIN matches an expected PIN. If so, SPITer/Subscriber A 401 may be connected to the Subscriber B 403 at 490. If not, SPITer/Subscriber A 401 may be forwarded to a consent mailbox (CMB) at 450 and subjected to a Turing test, such as an audio CAPTCHA test.

At 435, SPITer/Subscriber A 401 may indicate that SPITer/Subscriber A 401 does not have a PIN. In such a case, SPITer/Subscriber A 401 may be forwarded to a consent mailbox (CMB) at 450 and subjected to a Turing test, such as an audio CAPTCHA test.

At 450, the consent mailbox may request that the user enter a PIN identified in a message. For example, the voice box may play a simple message like "please enter 3341." The sender may understand the message and may physically type in the PIN number generating a Dual Tone Multi Frequency (DTMF) detectable tone. If the entered PIN matched the played PIN, the call/communication may be connected to the Subscriber B 403 at 490.

A more sophisticated Turing Test may be used. Such a test may, for example, include finding a solution to a mathematical problem. A sophisticated Turing Test may include a PIN that is identified in the message and encoded in such a way as to make it unintelligible to a voice recognition/interpretation system. The encoded message may not be so unintelligible that the caller is discouraged.

At 432, anonymous communication rejection may be used to determine that the caller is anonymous. If so, a denial announcement may be made at 440. At 416, a determination may be made whether a do not disturb condition is present. If so, a denial announcement may be made at 440.

At 417, a Call Diversion on Originating Identity with Time-of-Day (CD_OI ToD) feature may be implemented. For example, a time of day filter may be used together with a blacklist and/or a whitelist.

Platform validation information, such as information in the form of a predigested validation result, may be transported in IMS contextual information. The information may provide additional criteria for making a decision on how likely a communication is to be UC. Table 1 includes an exemplary list of contextual attributes that may be used to complement existing information in IMS messages.

TABLE 1

| Attribute | Type | Values | Explanation |
|---|---|---|---|
| UserIdentityStrength | static | Unknown<br>IMS-AKA<br>SIP Digest auth.<br>SIP Digest auth. with TLS<br>GIBA<br>NBA<br>Non-IMS verified subscriber<br>Non-IMS unverified subscriber. | Indicator of how trustworthy the presented origination identity is. This may depend on the strength of the authentication method, and to what extent the subscription can be tied to a person or organization. |
| DeviceIdentityStrength | static | Unknown<br>IMEI<br>ESN<br>. . . (others)<br>AIK (TCG) | strong identity binding. |
| CostCategory | static | Unknown<br>Free<br>Flat rate<br>Volume charged (per minute or per call) | Indicator of cost of communication. |
| OriginNetwork | static | Network | The network originating the request. |
| OriginNetworkType | static | Unknown<br>IMS<br>PSTN/CS<br>Internet<br>TCG TNC | Originating network category; assuming that different categories are associated with different trustworthiness. |
| CallComplaintFraction | dynamic | | Fraction of calls (real-time communications) from a specific user resulting in UC feedback. |
| MessagingComplaintFraction | dynamic | | Fraction of messages (non-real-time communications) from a specific user resulting in UC feedback. |

Figure 5:
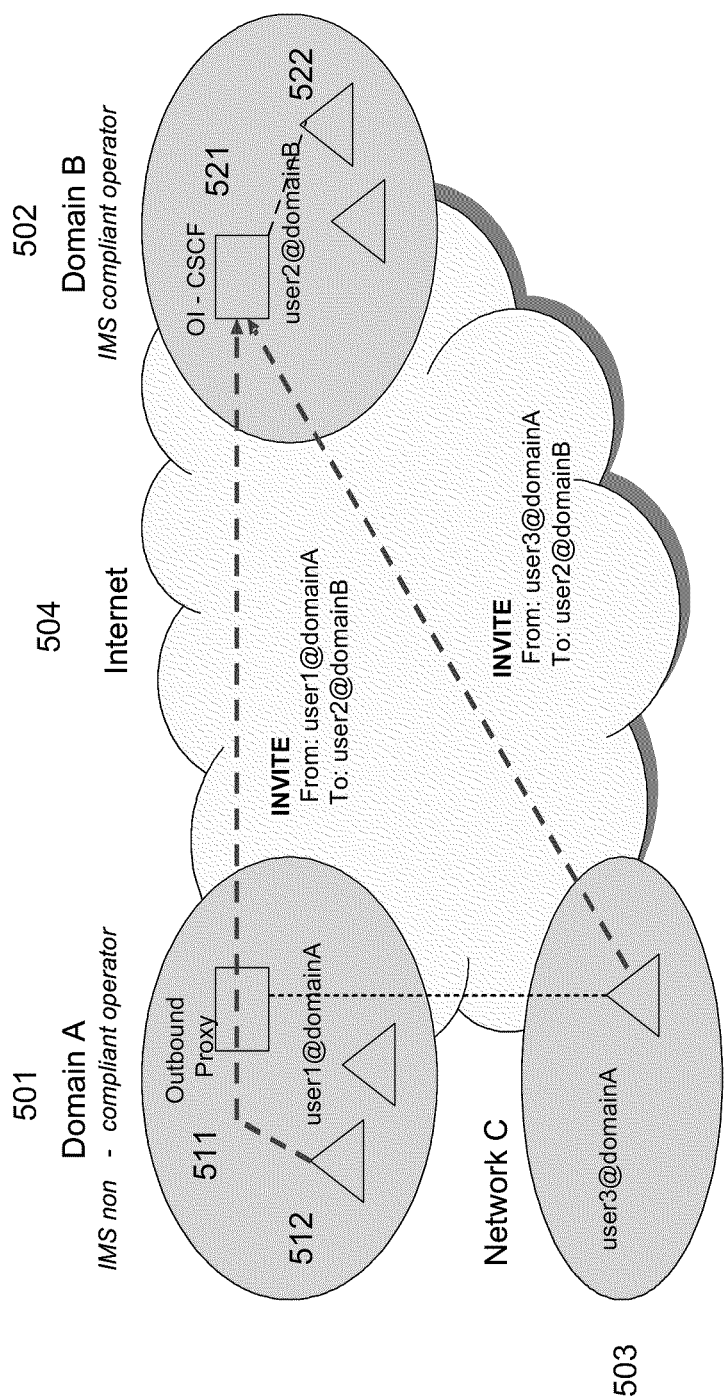
FIG. 5 illustrates another embodiment of a method and apparatus for protection against UC in an exemplary non-IMS interconnection network.

FIG. 5 illustrates another embodiment of a method and apparatus for protection against UC in an exemplary non-IMS interconnection network. FIG. 5 includes Domain A 501, Domain B 502, Network C, and Internet 504. Domain A 501 may be an IMS non-compliant operator and may include outbound proxy 511 and WTRU 512. Domain B 502 may be an IMS compliant operator and may include OI-CSCF 521 and WTRU 522. WTRU 512 in Domain A 501 may send a communication intended for WTRU 522 in Domain B 502.

UC protection for non-IMS interconnection may include an authorization phase in the sending domain. That is, the sending UE may trigger an authentication/authorization phase with outbound proxy 511 in Domain A 501.

The notification phase may be similar to a "Hello" procedure between Domain A 501 and Domain B 502 where Domain B 502 is notified of a forthcoming call. During this phase, Domain B 502 may perform a return routability check, e.g., to verify that the network information is valid and that the sender identity is asserted by Domain A 501. To verify the presented information using an assurance level, Domain B 502 may check if the sender can be reached at the network address given by Domain A 501.

A supporting identity infrastructure may be used. A supporting identity infrastructure may specify categories for identities, such as authentication strength, e.g., username/password, crypto token, two-factor, hardware-based, or hardware-bound sender hardware information (certified hardware and software on the device, integrity checked liability, etc.). For example, if Domain A 501 is able to resolve the claimed sender identity to be a real person or account so that the real person may be held liable for the claimed sender identity, then Domain A 501 may verify the sender identity.

Domain A 501 may send a collected set of assertions on the authenticated sender identity to Domain B 502. Domain B 502, the receiving network's infrastructure, may make a decision based on this received information. For example, Domain B 502, or individual users in Domain B 502, may specify that calls from authenticated senders where the identity can be resolved to a real-life person may be accepted. This information may be compiled into a sender scoring, which may allow Domain B 502 easier assessment of the likelihood that the message is UC.

The notification phase may be handled differently depending on whether a shared secret is available between Domain A 501 and Domain B 502. The notification phase may be initiated when a notification message comprising a ticket (e.g., ticketA) is sent from Domain A 501 to Domain B 502. This notification message may be sent by WTRU 512 or by outbound proxy 511 serving WTRU 512.

The ticket may be protected in a way that prohibits double spending and replay of the ticket. The ticket may also be bound to the hardware device of the sender in a way that it is restricted to be sent from the same device that was used to authenticate the sender in Domain A 501. The ticket may be associated with a secret that the sending device, WTRU 512, knows. Domain B 502 may then challenge WTRU 512 to prove possession of this secret in order to accept ticket A. The challenge may be based on a distribution of signing keys to WTRU 512, that WTRU 512 may use to sign ticket verification challenges from Domain B 502. WTRU 512 may employ zero-knowledge proofs to prove possession of the ticket for ticket validation between receiving Domain B 502 and the sending device, WTRU 512.

A notification request may be lighter to process than an INVITE request. Notification processing may be stateless for Call Session Control Function, OI-CSCF 521 in Domain B 502. A Notification request may not lead to reservation or opening of media ports as may be the case for an INVITE request with SDP payload. A Notification phase may be used by Domain B 502 to pass some challenge to be solved by the sending device WTRU 512 or outbound proxy 511 in Domain A 501.

The challenge may be sent to WTRU 512 and outbound proxy 511. If Domain B 502 can send the challenge directly to WTRU 512, it may do so. Otherwise, the challenge may be forwarded to WTRU 512 via outbound proxy 511. For the receiving network, Domain B 502, to trust a particular sending proxy, such as outbound proxy 511, Domain A 501 may send to Domain B 502 some verifiable information relating to the trustworthiness of the particular sending proxy and may send verifiable information claiming that WTRU 512 will reach Domain B 502 through this particular sending proxy. Part of the challenge may be answered by WTRU 512 directly, while other parts may be answered by outbound proxy 511. The challenge may provide receiving Domain B 502 with proof that WTRU 512 is registered in Domain A 501, Domain A 501 authenticated WTRU 512 and the sender identity, the caller initiated the call through WTRU 512, or that WTRU 512 is in a known, provable device state. The challenge may be protected from replay attacks by, for example, using a nonce, a timestamp which may be issued by outbound proxy 511, or both.

If the notification phase is successfully passed, the OI-CSCF 521 in Domain B 502 may decide whether to authorize the incoming call. The decision may be based on one or more of: a whitelist, a blacklist, user preferences, e.g., no calls allowed after 10 pm, sender or sending Domain reputation, verification of authenticated sender identity by given proof from Domain A 501, verification of WTRU 512 integrity by direct challenge for verification or challenge for a certified integrity check inside Domain A 501, which may then be checked by Domain B 502 OI-CS CF 521. The decision may be to reject the call, direct the call to a mailbox or to a SPIT analysis system or eventually accept the call.

If the call is allowed by Domain B 502, OI-CSCF 521 may generate a token for this specific call and pass it to Domain A 501. The token may be passed explicitly or implicitly through a parameter enabling Domain A 501 to derive the actual token from shared information with Domain B 502. The token may be protected against multi-spending, for example, by the use of a spending tracking counter, a nonce, or both, and may provide indicators of freshness and integrity, such as timestamps and signatures.

Privacy may be required if the token carries personal information relating to the caller or the callee. The token may be protected against interception and misuse by another device. The token may be bound to the receiving device, e.g., WTRU 522. This may include publishing an appropriate key to Domain B 502, or, if Domain B 502 trusts Domain A 501, Domain B 502 may wrap the token for the gateway of Domain A 501 and encrypt the key for WTRU 512. OI-CSCF 521 in Domain B 502, and outbound proxy 511 in Domain A 501 with the proxy sending the INVITE request, may pass the token to the function in Domain B 502 that is intended to receive the corresponding INVITE request.

Where there is no shared secret between Domain A 501 and Domain B 502, outbound proxy 511 in Domain A 501 may create a ticket during the authorization/authentication phase. The ticket may carry additional information about the sending device, such as device certificates, device state claims, or device software or hardware certificates. Domain B 502 may verify the information carried in the ticket through a trusted third party. Device related information that may be verified and checked by the receiving network (Domain B 502) directly may be included.

Network C 503 may be used to illustrate a roaming example. A sending entity may not be in Domain A 501. For example, the sending entity may be in Network C 503, and, the sending entity may have a network address in a network not belonging to Domain A 501. In such a case, the sending entity may be connected to outbound proxy 511 through the Internet.

Figure 6:
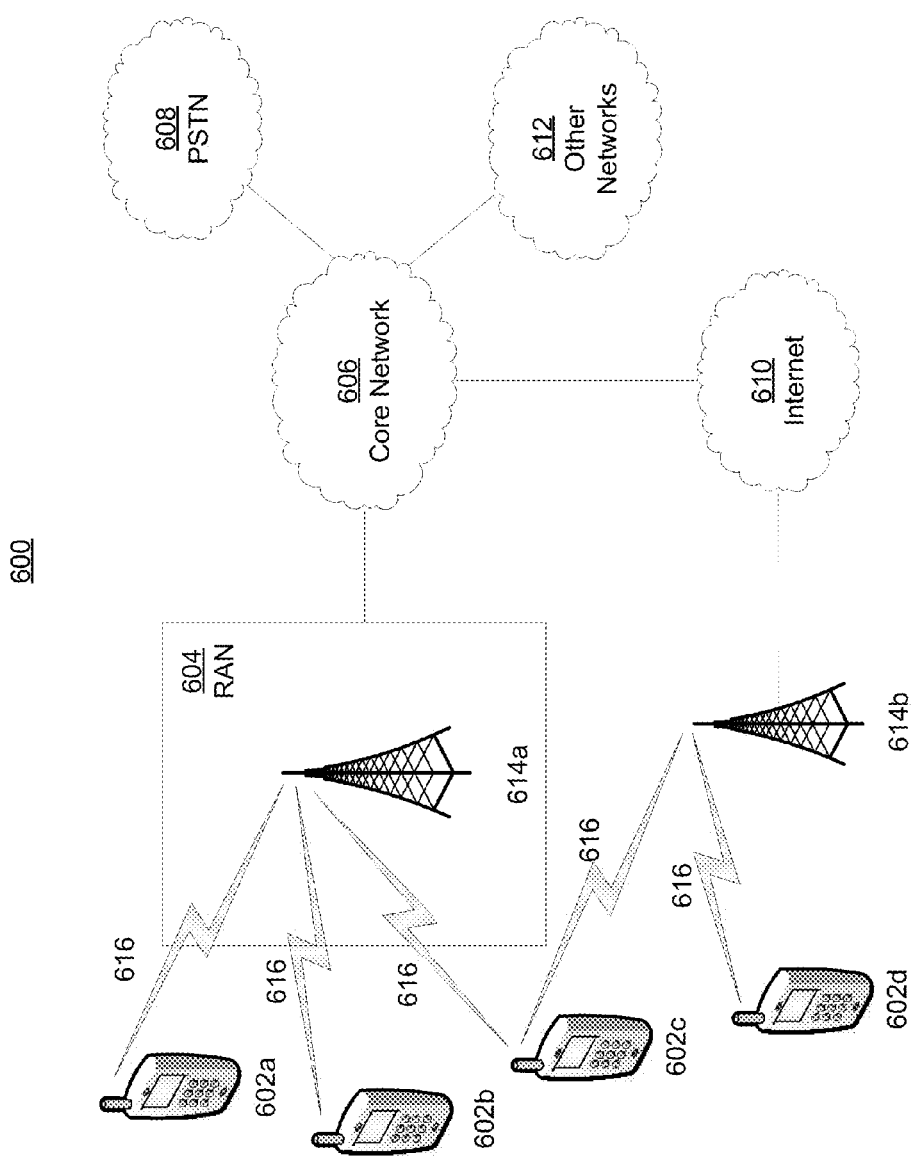
FIG. 6 is a system diagram of an example communications system in which one or more disclosed embodiments may be implemented.

FIG. 6 is a diagram of an example communications system 600 in which one or more disclosed embodiments may be implemented. The communications system 600 may be a multiple access system that provides content, such as voice, data, video, messaging, broadcast, etc., to multiple wireless users. The communications system 600 may enable multiple wireless users to access such content through the sharing of system resources, including wireless bandwidth. For example, the communications systems 600 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 6, the communications system 600 may include wireless transmit/receive units (WTRUs) 602a, 602b, 602c, 602d, a radio access network (RAN) 604, a core network 606, a public switched telephone network (PSTN) 608, the Internet 610, and other networks 612, though it will be appreciated that the disclosed embodiments contemplate any number of WTRUs, base stations, networks, and/or network elements that may include, but are not limited to, relay nodes, gateways, femto cell base stations, set-top boxes, etc. Each of the WTRUs 602a, 602b, 602c, 602d may be any type of device configured to operate and/or communicate in a wireless environment. By way of example, the WTRUs 602a, 602b, 602c, 602d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 600 may also include a base station 614a and a base station 614b. Each of the base stations 614a, 614b may be any type of device configured to wirelessly interface with at least one of the WTRUs 602a, 602b, 602c, 602d to facilitate access to one or more communication networks, such as the core network 606, the Internet 610, and/or the networks 612. By way of example, the base stations 614a, 614b may be a base transceiver station (BTS), a Node-B, an eNode B, a Home Node B, a Home eNode B, a site controller, an access point (AP), a wireless router, a wireless-capable set-top box, a wireless-capable home gateway, a relay node, and the like. While the base stations 614a, 614b are each depicted as a single element, it will be appreciated that the base stations 614a, 614b may include any number of interconnected base stations and/or network elements.

The base station 614a may be part of the RAN 604, which may also include other base stations and/or network elements (not shown), such as a base station controller (BSC), a radio network controller (RNC), relay nodes, etc. The base station 614a and/or the base station 614b may be configured to transmit and/or receive wireless signals within a particular geographic region, which may be referred to as a cell (not shown). The cell may further be divided into cell sectors. For example, the cell associated with the base station 614a may be divided into three sectors. Thus, in one embodiment, the base station 614a may include three transceivers, i.e., one for each sector of the cell. In another embodiment, the base station 614a may employ multiple-input multiple output (MIMO) technology and, therefore, may utilize multiple transceivers for each sector of the cell.

The base stations 614a, 614b may communicate with one or more of the WTRUs 602a, 602b, 602c, 602d over an air interface 616, which may be any suitable wireless communication link (e.g., radio frequency (RF), microwave, infrared (IR), ultraviolet (UV), visible light, etc.). The air interface 616 may be established using any suitable radio access technology (RAT).

More specifically, as noted above, the communications system 600 may be a multiple access system and may employ one or more channel access schemes, such as CDMA, TDMA, FDMA, OFDMA, SC-FDMA, and the like. For example, the base station 614a in the RAN 604 and the WTRUs 602a, 602b, 602c may implement a radio technology such as Universal Mobile Telecommunications System (UMTS) Terrestrial Radio Access (UTRA), which may establish the air interface 616 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 614a and the WTRUs 602a, 602b, 602c may implement a radio technology such as Evolved UMTS Terrestrial Radio Access (E-UTRA), which may establish the air interface 616 using Long Term Evolution (LTE) and/or LTE-Advanced (LTE-A).

In other embodiments, the base station 614a and the WTRUs 602a, 602b, 602c may implement radio technologies such as IEEE 802.16 (i.e., Worldwide Interoperability for Microwave Access (WiMAX), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 614b in FIG. 6 may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 614b and the WTRUs 602c, 602d may implement a radio technology such as IEEE 802.11 to establish a wireless local area network (WLAN). In another embodiment, the base station 614b and the WTRUs 602c, 602d may implement a radio technology such as IEEE 802.15 to establish a wireless personal area network (WPAN). In yet another embodiment, the base station 614b and the WTRUs 602c, 602d may utilize a cellular-based RAT (e.g., WCDMA, CDMA2000, GSM, LTE, LTE-A, etc.) to establish a picocell or femtocell. As shown in FIG. 6, the base station 614b may have a direct connection to the Internet 610. Thus, the base station 614b may not be required to access the Internet 610 via the core network 606.

The RAN 604 may be in communication with the core network 606, which may be any type of network configured to provide voice, data, applications, and/or voice over internet protocol (VoIP) services to one or more of the WTRUs 602a, 602b, 602c, 602d. For example, the core network 606 may provide call control, billing services, mobile location-based services, pre-paid calling, Internet connectivity, video distribution, etc., and/or perform high-level security functions, such as user authentication. Although not shown in FIG. 6, it will be appreciated that the RAN 604 and/or the core network 606 may be in direct or indirect communication with other RANs that employ the same RAT as the RAN 604 or a different RAT. For example, in addition to being connected to the RAN 604, which may be utilizing an E-UTRA radio technology, the core network 606 may also be in communication with another RAN (not shown) employing a GSM radio technology.

The core network 606 may also serve as a gateway for the WTRUs 602a, 602b, 602c, 602d to access the PSTN 608, the Internet 610, and/or other networks 612. The PSTN 608 may include circuit-switched telephone networks that provide plain old telephone service (POTS). The Internet 610 may include a global system of interconnected computer networks and devices that use common communication protocols, such as the transmission control protocol (TCP), user datagram protocol (UDP) and the internet protocol (IP) in the TCP/IP internet protocol suite. The networks 612 may include wired or wireless communications networks owned and/or operated by other service providers. For example, the networks 612 may include another core network connected to one or more RANs, which may employ the same RAT as the RAN 604 or a different RAT.

Some or all of the WTRUs 602a, 602b, 602c, 602d in the communications system 600 may include multi-mode capabilities, i.e., the WTRUs 602a, 602b, 602c, 602d may include multiple transceivers for communicating with different wireless networks over different wireless links. For example, the WTRU 602c shown in FIG. 6 may be configured to communicate with the base station 614a, which may employ a cellular-based radio technology, and with the base station 614b, which may employ an IEEE 802 radio technology.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (WTRU), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

What is claimed:

1. A method for preventing delivery of an unsolicited communication, the method comprising:
   receiving, at an identity gateway in a sending domain, an indication of a communication from a sending device in the sending domain, wherein the communication is intended to be delivered to a receiving device in a receiving domain, and wherein the identity gateway provides authentication information, relating to one or more sending devices in the sending domain, to domains other than the sending domain;
   determining the authentication information relating to the sending device;
   determining information associated with a trustworthiness of the identity gateway in the sending domain, the information associated with the trustworthiness of the identity gateway comprising a network asserted identity that is incapable of being manipulated and
   sending the authentication information and the information associated with the trustworthiness of the identity gateway to at least one of a receiving network or the receiving device in the receiving domain, wherein the authentication information and the information associated with the trustworthiness of the identity gateway are capable of being evaluated to determine if the communication is unsolicited, wherein the authentication information and the information associated with the trustworthiness of the identity gateway are part of a Session Initiation Protocol Invite that is sent to at least one of the receiving network or the receiving device in the receiving domain, wherein determining authentication information comprises determining a sender identity associated with the sending device.

2. The method of claim 1, wherein determining authentication information further comprises determining a strength of the sender identity associated with the sending device.

3. The method of claim 1, wherein the strong sender identity comprises a network asserted identity.

4. The method of claim 1, wherein the sender identity is incapable of being manipulated by a sender of the communication.

5. The method of claim 1, wherein the authentication information comprises state information relating to a health status of the sending device.

6. The method of claim 5, wherein the health status relates to a virus protection software status on the sending device.

7. The method of claim 5, further comprising at least one of:
   removing malware from the sending device; or
   removing malware from a network element associated with the sending device.

8. The method of claim 1, wherein the authentication information comprises a credential issued by the identity gateway.

9. The method of claim 8, wherein the credential issued by the identity gateway is a network asserted identity.

10. A method for preventing delivery of an unsolicited communication, the method comprising:
    receiving, at a receiving domain, authentication information associated with a sending device at a sending domain wherein the authentication information is received from at least one of: the sending device or a sending network at the sending domain, wherein the authentication information indicates that an identity gateway at the sending domain has performed an authentication of the sending device, and wherein the identity gateway provides authentication information, relating to one or more sending devices in the sending domain, to domains other than the sending domain;

receiving, at the receiving domain, information associated with a trustworthiness of the identity gateway, the information associated with the trustworthiness of the identity gateway comprising a network asserted identity that is incapable of being manipulated by the identity gateway; and determining from the authentication information and the information associated with the trustworthiness of the identity gateway, if a communication from the sending device associated with the authentication information is unsolicited, wherein the authentication information and the information associated with the trustworthiness of the identity gateway are part of a Session Initiation Protocol Invite, and wherein a personal routing profile from a Home Subscriber Server (HSS) is used along with the Session Initiation Protocol Invite to determine whether to drop the proposed communication, wherein the authentication information comprises a sender identity associated with the sending device.

11. The method of claim 10, wherein the sender identity comprises a network asserted identity.

12. The method of claim 10, wherein the sender identity is incapable of being manipulated by a sender of the communication.

13. The method of claim 10, wherein the sender identity is bound to the sending device and is incapable of use with another device.

14. The method of claim 10, further comprising collecting sender identity information and creating a score relating to the sender identity information, wherein the score is capable of being used to assess trustworthiness of the sending device.

15. The method of claim 10, further comprising receiving a score and storing the score in a trusted environment on the sending device, wherein the score is capable of re-use by the sending device and incapable of use by other devices.

16. The method of claim 10, wherein the authentication information comprises state information relating to a health status of the sending device.

17. The method of claim 10, wherein the authentication information comprises a credential issued by the identity gateway.

18. The method of claim 17, wherein the credential issued by the identity gateway is a network asserted identity.

* * * * *